US007096203B2

(12) United States Patent
Pence et al.

(10) Patent No.: US 7,096,203 B2
(45) Date of Patent: Aug. 22, 2006

(54) METHOD AND APPARATUS FOR DYNAMIC RENEWABILITY OF CONTENT

(75) Inventors: William E Pence, New York, NY (US); Dik Langan, Winnetka, CA (US); Cynthia Healy, Woodland Hills, CA (US); Geoff Schreiber, Portland, OR (US); Donna Penick, North Hills, CA (US)

(73) Assignee: Duet General Partnership, New York, NY (US)

( * ) Notice: Subject to any disclaimer, the term of this patent is extended or adjusted under 35 U.S.C. 154(b) by 0 days.

(21) Appl. No.: 10/017,498

(22) Filed: Dec. 14, 2001

(65) Prior Publication Data

US 2003/0115069 A1 Jun. 19, 2003

(51) Int. Cl.
*G06F 17/60* (2006.01)
(52) U.S. Cl. .............................. 705/59; 705/50; 705/51; 705/54; 705/57
(58) Field of Classification Search .................. 705/50, 705/51, 52, 53, 54, 57, 59
See application file for complete search history.

(56) References Cited

U.S. PATENT DOCUMENTS 5,023,907 A * 6/1991 Johnson et al. ............. 710/200
5,553,143 A * 9/1996 Ross et al. .................... 705/59
5,790,664 A * 8/1998 Coley et al. ................ 709/203
5,925,127 A * 7/1999 Ahmad ....................... 713/200
6,009,401 A * 12/1999 Horstmann .................... 705/1
6,021,438 A * 2/2000 Duvvoori et al. ........... 709/224
6,056,786 A * 5/2000 Rivera et al. ............... 717/168
6,189,146 B1 * 2/2001 Misra et al. ................ 717/177

FOREIGN PATENT DOCUMENTS

JP 06223040 A * 8/1994

OTHER PUBLICATIONS

Kristin marks, "Pleased to meter you", Network World, v12n50 p. 53-57, Dec. 11, 1995.*

* cited by examiner

*Primary Examiner*—Calvin L. Hewitt II
(74) *Attorney, Agent, or Firm*—Darby & Darby

(57) ABSTRACT

A method and apparatus for dynamically and transparently renewing licenses associated with downloaded content. Licensing associated with content can allow the provider to retain control over the content after it has been downloaded on to the user's computer. A license file or similar licensing parameter is the key to retaining control over access to the content after it has been downloaded. The license file may also control copying of the content on to computers other than the original computer used. The dynamic renewal method will transparently renew the license files on a user's computer to allow the associated content to be used without disruption as long as the user's account is in good standing.

16 Claims, 5 Drawing Sheets

METHOD AND APPARATUS FOR DYNAMIC RENEWABILITY OF CONTENT

FIELD OF THE INVENTION

This invention generally relates to the field of communication, and more specifically to the licensing and protection of electronic content files.

BACKGROUND OF THE INVENTION

The proliferation of the World Wide Web through the Internet has made a wealth of content available to a user with nearly instantaneous access time. Much of the content available is in multimedia (i.e., audio and/or video) format, including music, video and news reports. The user can request specific content and retrieve the content on any computer and/or processor-enabled device anywhere there is a connection to the Internet. Users may purchase the content over the Internet using subscription management systems which control and track the content being delivered. Alternatively, users can also purchase content, with controls being placed on the purchased content.

Conventional subscription management methods allow users to rent digital content as part of a recurring subscription fee. The subscription method allows a user to pay a set fee and access (e.g., download or stream) a predefined amount of content for that fee over a set period of time. The fee is charged regardless of whether the user downloads no content or if the user downloads the maximum amount of content allowed during that period. There are different levels of subscription fees that are related to the amount of content allowed to be downloaded or streamed in a given period of time, usually a month. The pay-as-you-go system requires the user to pay for the content he actually downloads or streams. There is no subscription fee that needs to be renewed after a period of time. In the pay-as-you-go system, the user can browse for content and download that content at any time and download as much content as the user is willing to pay for.

The conventional subscription services use a basic system configuration. In this system the provider can have a Content Server where all the content is stored for access by a user. This system can also include a means to monitor a user's account and control access to the content. Both the monitoring and control means and the Content Server can either be in communication with each other or can be part of the same system.

In the case of purchased content, controls may be placed on the use of the content. These controls may take the form of limits on how many times the content may be used and which machine and/or playback devices the content may be used with. These types of controls for purchased content are essentially permanent in the sense that the seller no longer has any connection to the content after the purchase. Thus, the controls may not be changed or modified after the purchase.

Regardless of how the user pays for access to content, the above systems generally suffer from the same disadvantage. This disadvantage is the lack of continued control over the content once it is downloaded. The two types of conventional subscription management systems described above make checks on the user's status in regard to the amount of content downloaded, but once the content is removed from the provider's server and saved to the user's computer, the provider loses all control over the content. Thus, the user can make numerous copies of the content and have the content on numerous computers. The fact that a user might make numerous unauthorized copies from the one copy paid for is of great concern for the protection of the content author's and the content owner's rights and must be taken into account when fees are being set. Every copy a user makes is a lost sale of the content, and thus lost revenue. The revenues must be recouped and the typical way to recoup them is to increase the price of the content. The fact that a copy of digital content is the same quality as the original content removes a barrier to copying because there is no reduction in quality from repetitive copying. Thus, losing control of the content once the user gains control of the content file reduces profitability and can lead to numerous other problems, such as copyright infringement and the like.

In the case of subscription purchase of content, there is an essential need for a method and apparatus that is capable of tracking and disabling the content downloaded on to a user's computer once a user terminates the subscription. That is because in the subscription model, the user is renting the content, and has not purchased ownership rights. The present invention satisfies the need for disabling the content of a terminating subscriber, while continually renewing the content rights for users whose account remains in good standing, without a burdensome and unfriendly user experience, such as forcing the user to manually select content for renewal in each new subscription period.

There is a need for a method and apparatus that is capable of tracking and protecting content once it is downloaded on to a user's computer. Control of the content once it is on the user's computer can reduce the risk that unauthorized copies can be created. This control can allow for greater sales of the content as the number of unauthorized copies is diminished. The increase in sales can lower the amount needed to be charged for the content to recoup the initial investment and make a profit, thus lower prices can be passed on to the consumers. The present invention satisfies the need for control over the content and other needs.

SUMMARY OF THE INVENTION

The present invention relates to a method and apparatus for dynamically and transparently renewing the licenses associated with downloaded content. Licensing associated with content can allow the provider to retain control over the content after it has been downloaded on to the user's computer. This protects the content from being copied, and enables a 'subscription model' for the continued use of the content wherein access to the content on the user's computer can be restricted if the user's account is not in good standing. This is opposed to no protection or permanent protection.

The invention can include a provider's system and a user's computer. The provider's system can include a Web Server, a Subscription Management System, a Licensing Server and a Content Server. The user's computer can include a Client, a Content Player, Internet Browser, and a License Storage location. In overview, the user can make a request for content to the provider and the provider's system will then verify the user's account is in good standing. Once verified, the system can then transmit a License File with the requested content.

A License File or similar licensing parameter is the key to retaining control of the access to content after it has been downloaded. The License File contains numerous pieces of information regarding how the content can be consumed. Access restrictions can be based on the number of times the content can be accessed or a particular date after which the content is no longer accessible, or the type of device to which the content may be transferred. Additionally, in the subscription context, the License Files may contain the subscription Date Paid To ("DPT"), which is the date through which the user's subscription to the content provider can remain active. The License File may also include the Expiration Date ("ED"), which is the DPT date plus a preset Grace Period of time after the DPT. Once the ED is reached, access to the content will be restricted. The Grace Period is a certain number of days past the DPT to allow uninterrupted use of the content after the DPT, but prior to the user logging back on to renew his subscription. The Grace Period may be a fixed period of time in each instance but that amount may be altered by the subscription service for any access period. The License File may also include information about the specific computer the content was downloaded onto.

The dynamic renewal method will renew the License Files on a user's computer to allow the associated content to be used without disruption as long as the user's account is in good standing. The DPT date may be set for different time periods to allow the user's account to remain in good standing through the next time period. For example, where the DPT is set to be monthly, the user will be allowed access for an additional month going forward after the most recent renewal. Any type of content can be regulated, but an example of some types of content are audio music files or video movie files. The renewal licensing method can also regulate a number of other parameters. These parameters may include which files can be downloaded, this is determined from the Licensing Server, and the License File may specify the particular computers the user can access the content on.

The basic arrangement of the invention can include any number of servers or databases but one embodiment is described below.

The user of the subscription service can be required to install a Client application on his computer. The Client can be both a content player and an internet browser or can interface with commercially available third party content players (e.g., Microsoft® Windows Media Player®) and internet browsers (e.g., Microsoft® Internet Explorer®). Also, certain databases and storage locations can be created on the user's computer to store the license files and registry information. These databases and storage locations can include a License Storage location. The License Storage location can store the actual License Files for each piece of content. The Local Database can store the license information and keep track of the content downloaded and streamed by the user. A Registry can also keep track of the DPT parameter. The DPT may be stored in the Subscription Management Service ("SMS"). When a license is delivered, it contains the ED. The License File forces the content to expire upon reaching the ED. The DPT and ED may be generated by the SMS whenever a License File is needed, whereas the License File may understand only a single date, the ED for the file. The DPT in the Registry is one place the Client can access the information to know when the user needs to renew his subscription. The Client can interface with the provider's Servers any number of ways, including over the Internet or an intranet.

The content provider can utilize a SMS which can keep track of all of the user's information. The user's information includes his account status, billing information, the ED and the DPT. There can also be a License Server which can keep track of the content the user is allowed to access and download or stream given his payment plan, country of origin and type of content he is requesting. The License Server and/or the SMS can keep a running total of the amount of content the user has downloaded or streamed and compare it to the amount of content the user is allowed according to his payment plan. Another server a content provider can utilize is a Content Server which contains all of the content available though the provider's service. This content can include audio, video, text or any combination of the above. The content provider can also utilize a Web Server which contains the web and Internet information required for the provider to have a website.

The Client can access each of the servers individually or can access the content provider's Web Server and the Web Server can interface with each of the individual servers to provide the needed functionality. Regardless of how the servers are interfaced and accessed, the information contained on the servers can be shared between the servers and the Client to allow for the proper licensing to be created and enforced.

The invention allows a user to log on to a subscription service and download the content he or she requests and have that content available for a set period of time. Upon initiation of each download request, the SMS may verify the user's identification and account status. If that verification is successful, the SMS can create a license to access the License Server and then sends the request accompanied by the license to the License Server. The License Server determines if the request can be granted and creates a License File for each and every separate piece of content the user requests. The content may be encrypted using any third party encryption techniques or digital rights management system (e.g., Microsoft® Windows Media Digital Rights Management®). License Files are then sent to the user's computer without notifying the user, and then the content is downloaded or streamed to the user. So, for example, if the user requests twelve (12) separate pieces of content (e.g., 12 different songs) there will be 12 corresponding license files sent along with the 12 pieces of content. The License Files for streaming content may be handled in a different manner. One License File may be generated for the entire streaming session. Every piece of content streamed may be covered under a single License File for that session. Alternatively, there are numerous other methods for the licensing of downloaded content. One method can be to transmit one Master License File that licenses all the content from a particular provider. Thus, the Master File would only be sent once and updated as new content was accessed. Another alternative method is to create and send license files for each session and then each time a user logs in to the system a new license file would be generated and transmitted with the content accessed in that session, and/or content previously downloaded in order to provide the user with uninterrupted access.

Regardless of how many License Files are utilized, once downloaded, the License File can control access to the corresponding content. The user can access the content up to and through the DPT date until the ED date. Once the ED date is reached, if the License File is not renewed with the new DPT and ED dates, access to the content can then be restricted.

The License File may also control copying of the content on to computers other than the original computer used. The License File contains specific information about the computer it was downloaded onto and can allow access to the content only on that specific computer. Also, since the License File may be sent separate to the content and remain as a separate file, if the content is copied to another computer the license file may not be copied with it. If the License File is not present with the content on the same computer that may also prevent the content from being accessed. The License Files may also be configured to only allow access on the computer for which the file was intended upon creation of that file. Alternatively, the License File can be updated to reflect additional computers and the additional computer's content and license files can be updated and copies of the content and new License Files can be sent to the additional computers.

There are a number of activities that a user can perform that can trigger a License Renewal. Once a triggering activity is performed, the Client checks the Registry and determines if the License Files need to be renewed. If the licenses need to be renewed, the Client makes a request to the SMS the next time the user is logged in to the provider's service. If the DPT and ED dates have been changed from the values stored in the Registry, (i.e., the user's subscription for that next period has been paid for) the SMS can generate a new license file request and send that request to the License Server. Either the SMS or the License Server may also check the content of the user's content library. The SMS can query the user's library directly and determine if any of the content cannot be renewed (e.g., if the rights to access that content have expired). However, the License Server may restrict content indirectly, it may not know the DPT of the files previously delivered but the License Server checks the validity of any request for new content. The License Server will generate a new License File for every piece of content that can be renewed; if the content cannot be renewed, a new license will not be generated. The new License Files are then transferred to the user's computer. The new License Files can replace the old License Files and the content can then be available for access until the new ED. This process will repeat until the user stops subscribing, at which point the license files will expire and access to the content will be denied until the subscription is paid and the License Files renewed. Alternatively, the dates in the License Files can be changed using other methods, for example, the date can be updated by just changing the date in the existing file and not replacing the old file. This eliminates the need to transmit an entirely new license file in order to change one piece of information within the file.

There are a number of activities that will trigger the renewal process. These activities include: the user logging in to his account during the grace period; after a particular grace period has expired; any time the user launches the Client while on or off the internet; and when the user attempts to download new content or access existing content.

While the present invention is described by way of reference or example to the Internet, it should be understood that any other communication system may be used in place of the Internet.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
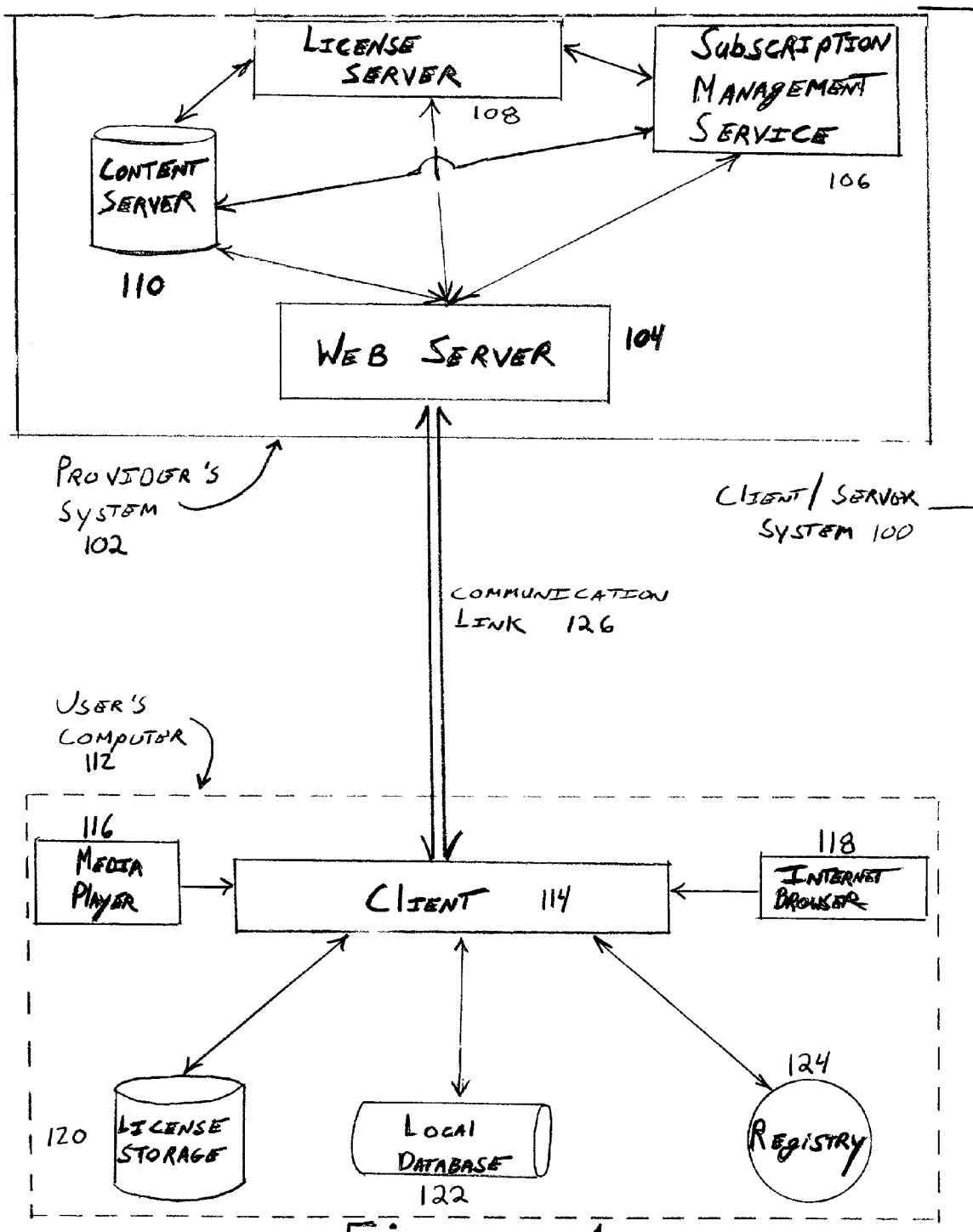
FIG. 1 is a block diagram of the client-server system of an embodiment of the present invention.

Referring now to FIG. 1, therein is shown the overall client-server system 100. The client-server system includes a content provider system 102 and the User computer 112.

The provider system 102 includes a Web Server 104, a Subscription Management Service (SMS) 106, License Server 108, and the Content Server 110. The Web Server 104 is a computer or processor controlled device that is in communication with the Internet, intranet or any other means of communication. The Web Server 104 runs software that allows users to access the server over the Internet and contains the content provider web page. The Web Server 104 is also in communication with the SMS 106 which maintains user account information. Both the Web Server 104 and the SMS 106 are in communication with the License Server 108, which keeps track of the amount and type of content a user is allowed to access and download. Lastly, Web Server 104, the SMS 106, and the License Server 108 are all in communication with the Content Server 110. The Content Server 110 contains all of the content the provider wishes to provide and a means to keep track of the content (e.g., a catalogue). The Web Server 104, the SMS 106, the License Server 108, and the Content Server 110 can all be on the same computer or they can be on separate computers in the same general vicinity, or distinct servers in distant locations, or they can be located using any combination of the above.

The User computer 112 is usually at a distance from the provider system 102 and they are in communication with each other through the Internet, Intranet or any other means of communication. Typically, the User computer 112 includes a Client Application 114, Media Player 116, an Internet Browser 118, a License Storage location 120, a Local Database 122 and a Registry 124. All of the above components are typically located on the User computer 112 and are in communication with each other. The Client 114 on the User computer 112 communicates with the provider system 102 through the Web Server 104. The Client 114 links to both a Media Player 116 and a Internet Browser 118. The Media Player 116 is capable of reading and displaying the content being requested from the provider. The Internet Browser 118 allows the User computer 112 to access the Internet for one of the methods of establishing a communication link 126 with the Web Server 104. The License Storage 120 is a file or a directory on the User computer's 112. The License Storage 120 stores each of the individual License Files or the master license file that must accompany the content for the content to be downloaded. The Local Database 122 is also located on the User computer 112 and the Local Database includes a list that keeps a running tally of what content the user possesses. Lastly, the Registry 124 keeps track of the DTP contained in the License Files. The Registry 124 extracts the DPT from each license file to allow for quick access to that information.

Figure 2A:
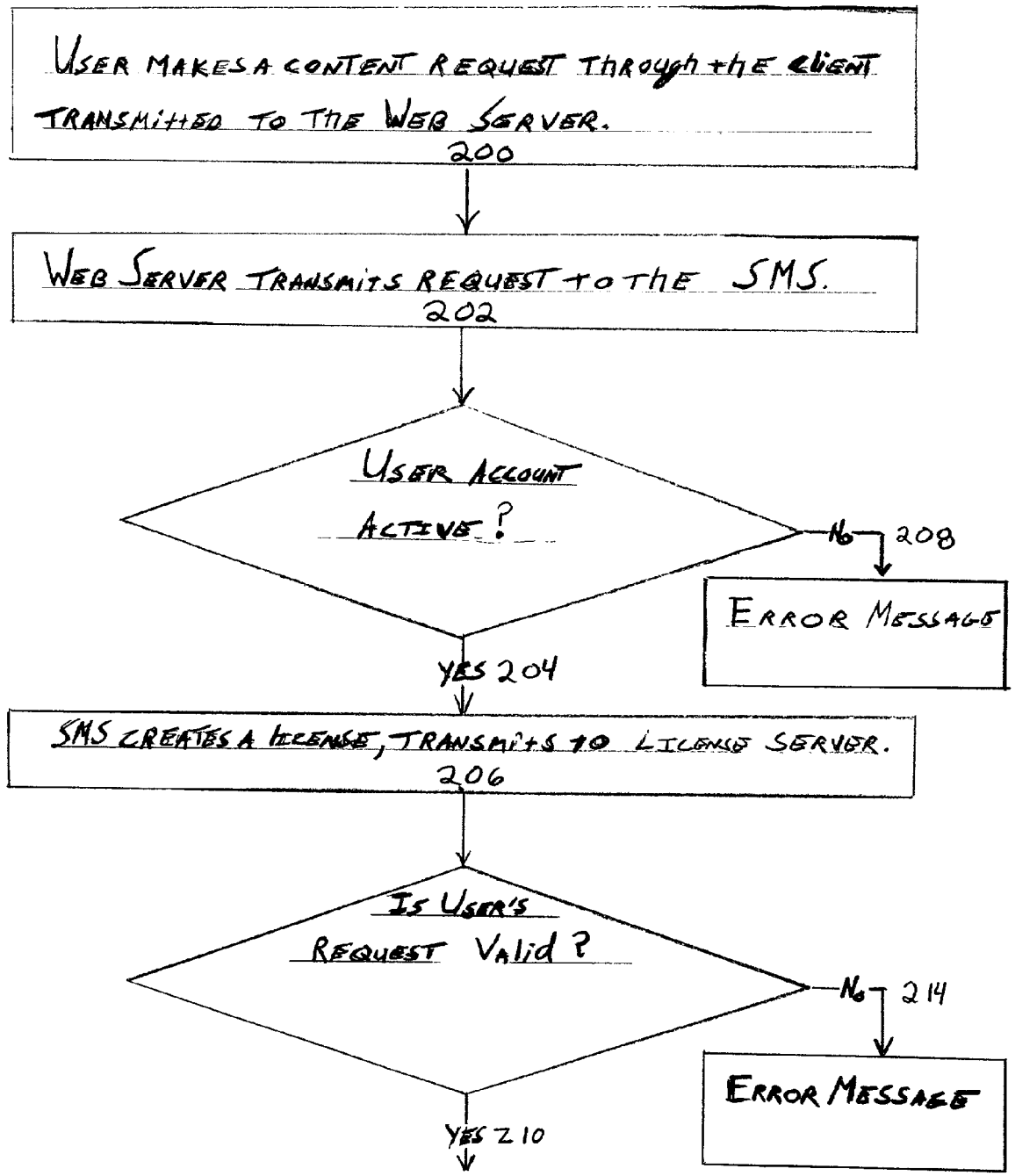
FIGS. 2A and 2B are flowcharts of the User Request and Content Download Process of the present invention.
Figure 2B:
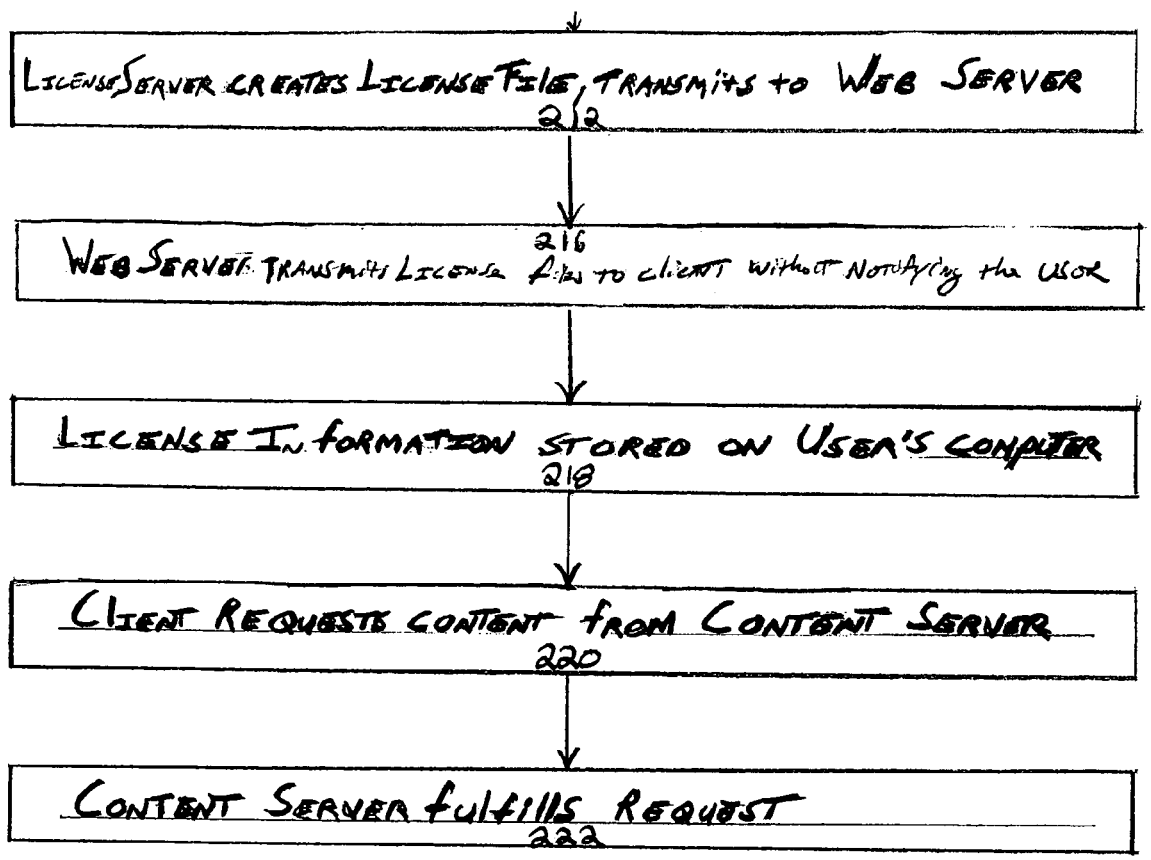

The User Request and Content Download Process is shown in FIGS. 2A and 2B. Typically, the User is already in communication with and logged in to the provider system when the User makes a content request through the Client. The Client then transmits the request over the communication link to the Web Server (step 200). The Web Server then receives the request and sends the request to the SMS (step 202). The SMS then verifies the user's account and checks the status of the account (step 204). If the account is in good standing the SMS will create a license and send the request and license to the License Server for further processing (step 206). If the User's account is not in good standing, the User will be returned an error message and given a chance to remedy the deficiency in his account (step 208). The License Server then determines if the User's request can be granted (step 210). If the User does not have the rights to access the content he requests he will be returned an error message and given an opportunity to correct his request (step 214).

FIG. 2B continues the process set out in FIG. 2A. If the User has the rights to his requested content (checked in step 210), the License Server creates the License File that will accompany the, content and then sends a message to the Web Server on the status of the request (step 212). The Web Server then transmits the status of the request and the License Files to the Client without notifying the user (step 216). The Client then sends the license information and/or files to be stored on the User computer and the information is sent to three separate locations. First, the Local Database records the information on the new content. Next, the License Store actually holds the individual License Files and the Registry records and keeps track of the DPT date (step 218). The Client then transmits the approved request to the Content Server for fulfillment (step 220). Finally, the Content Server fulfills the request and transmits the requested content to the User computer (step 222). That content will be available for access as long as the User's account is in good standing. Another embodiment can transmit the License Files to the Client at the same time as the content is downloaded. Thus, once a License File is created by the License Server, it can transmit the request to the Content Server and the Content Server can deliver the Content to the Web Server so both the License Files and Content can be downloaded simultaneously. The License Files and information can then be stored on the User computer in the same fashion as above.

Figure 3A:
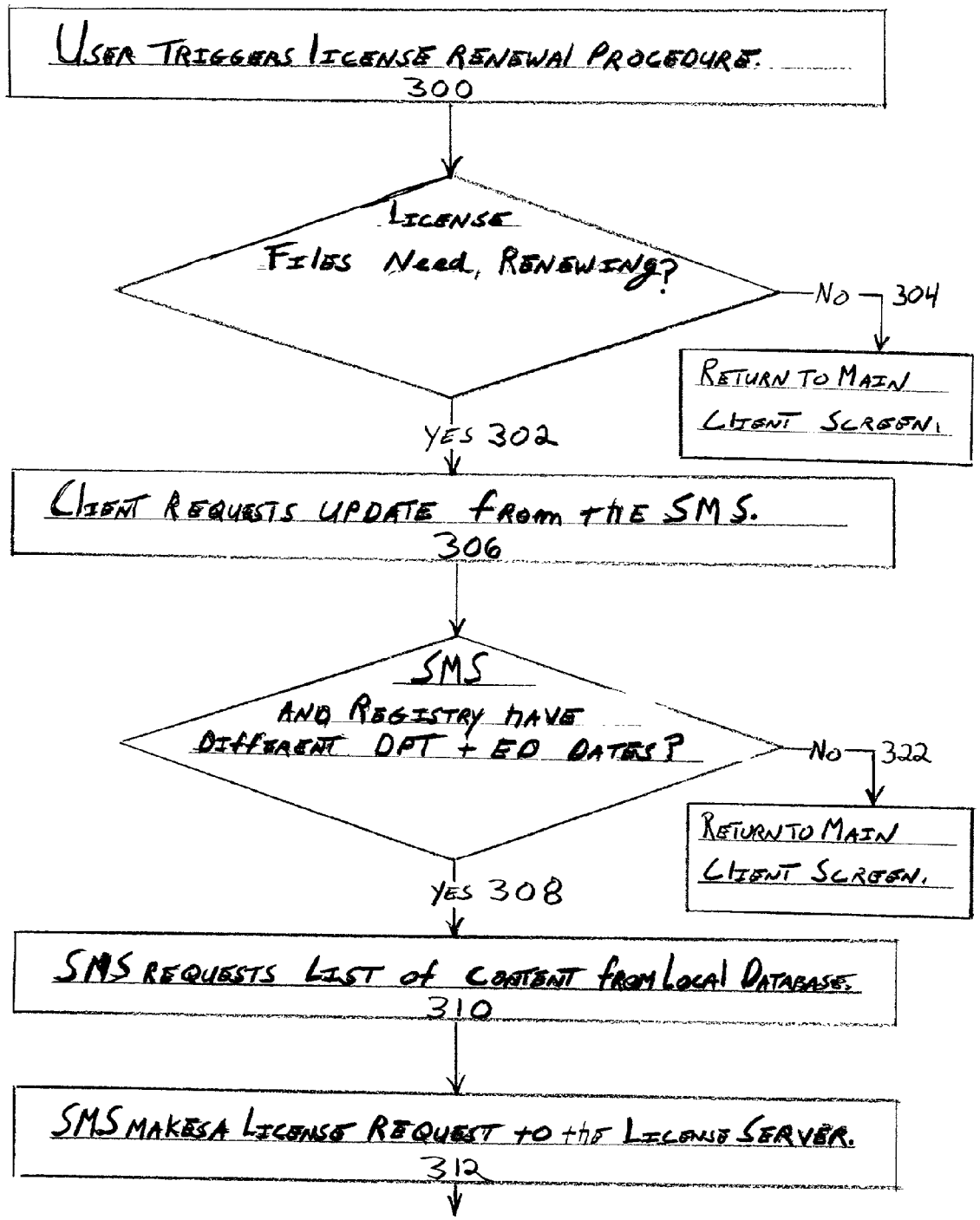
FIGS. 3A and 3B are flowcharts of the License Renewal Process of the present invention.
Figure 3B:
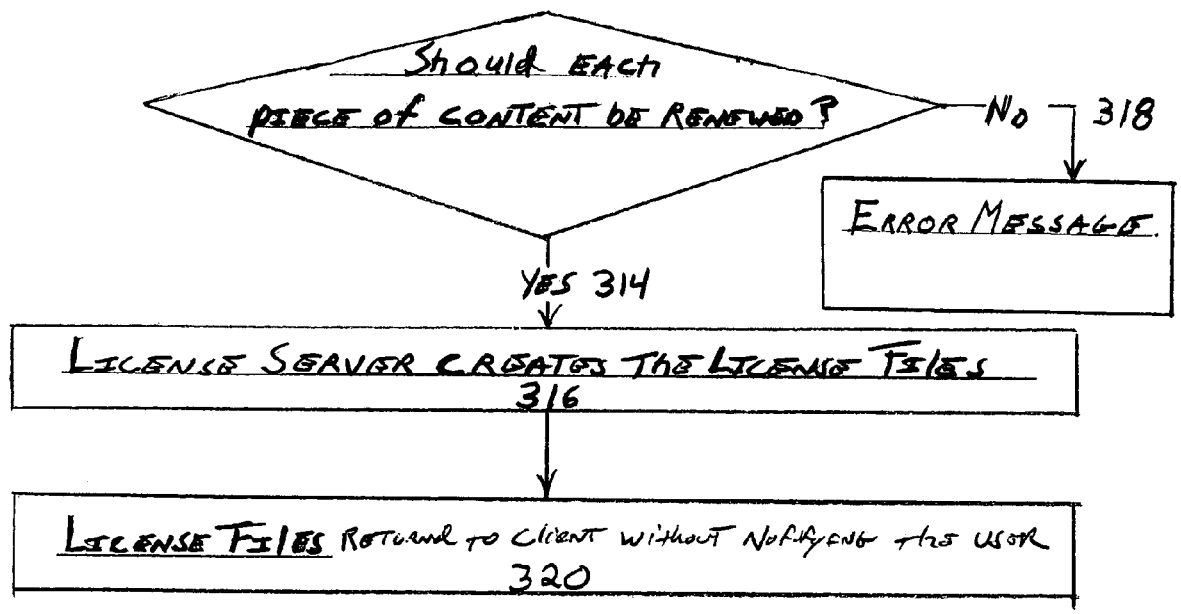

FIGS. 3A and 3B illustrate the License Renewal Process of the present invention. First, the User performs an action that triggers the license renewal procedure (step 300). This can be the user logging in to his account during the grace period; or after the operation of a particular subscription period any time the user launches the Client while on or off the internet; or when the user attempts to download new content or access existing content. Once the procedure is triggered, the Client then checks the Registry to see if the License Files need to be renewed (step 302). If the License Files do not need to be renewed, the Client will return the User to the main screen and continues to perform as it normally would (step 304). However, if the License Files do need to be renewed, the Client requests the SMS to update the License Files (step 306). The Subscription Management System then compares its current DPT and ED date for that particular user with those stored in the Registry (step 308). If the DPT and ED dates are the same, the program defaults back to the Main Client Screen for a content request (step 322). If the Server Management System dates are later in time than the dates in the Registry, the Server Management System will generate a request to the Local Database for a list of all the content on the User computer and the Local Database is queried for a list of the current content on the User computer. The list of content is returned to the Server Management System (step 310). The Server Management System then compiles a license request with the content list it received from the Local Database and sends the request to the License Server (step 312).

FIG. 3B continues the process set out in FIG. 3A. The License and Rights Server then verifies if renewals of the licenses can be acquired for each track (step 314). If a track cannot be renewed, the Client will receive an error message and no License File will be created for that item of content (step 318). However, all of the tracks that can be renewed will have a License File generated by the License and Rights Server (step 316). The License File contains the DPT and the ED and may also include information about the specific computer the content was downloaded onto. The License Files are returned to the Client to renew them and their information stored in the appropriate places on the User computer without notifying the user (step 320). Those locations can be the License Storage, Local Database and the Registry.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. An apparatus for providing dynamic renewability for content provided from a content provider to a user, comprising:
   a content provider system, said content provider system including:
   a content server, to store and retrieving content items;
   a communication server, communicating with said user, said communication server receiving content items from said content server and communicating said content items to said user; and
   a license server, monitoring an amount and a type of content communicated to said user, said license server having stored thereon one or more license files, each said license file containing one or more parameters relating to one of said content items including information regarding the content and a date;
   and a user system, said user system including:
   a communication application, communicating with said communication server in order to receive content items and license files;
   a client application running on said user system receiving said license files and a user input and providing said user input to said communication application;
   a license storage, storing said one or more license files on said user system;
   a content information storage, storing information regarding content items requested by said user and received from said content provider system; and
   a registry storing said date;
   wherein said content provider system comprises a device to transmit said license files to said user without notifying said user.

2. The apparatus of claim 1, wherein said content provider system further comprises a subscription management service to monitor and maintain said one or more license file parameters.

3. The apparatus of claim 2, wherein said subscription management service compares license file parameters on the content provider system and the license file parameters on the user system.

4. The apparatus of claim 1, wherein said one or more license file parameters comprise one or more of the following parameters: date, user's country of origin, monetary value on account, user's technical information, type of content to be downloaded, number of times the content has been downloaded and grace periods.

5. The apparatus of claim 1, wherein said license server creates said license file.

6. The apparatus of claim 1, wherein said communication server receives said license file from said license file server and transmits said license file with said content to said user system.

7. The apparatus of claim 1, wherein the content provider system further comprises a device to update said license file by communicating an updated license file from the content provider system to said user system without notifying the user.

8. The apparatus of claim 1, wherein the content provider system further comprises a device to update said license file by communicating an updated license file parameter from the content provider system to said user system without notifying the user.

9. A method for dynamic renewability of content comprising the steps of:

receiving a request for content from a client running on a computer of a user;

verifying that the user is authorized to receive the content;

creating a license file having one or more parameters for the user requested content when the user is authorized, wherein the license file parameters includes information regarding the content and a date;

transmitting the license file to the client without notifying the user;

storing on the user computer the information regarding the content in a local database, storing the license file in a license store, and storing the date in a registry;

transmitting the user requested content item from a provider system to the user;

permitting access to the content by the user when the license file is received by the user computer;

comparing the one or more parameters contained in the license file to corresponding one or more provider system license file parameters to determine whether or not the user is allowed access to the user requested content item; and selectively renewing the parameters in the license file, without notifying the user, when the parameters in the license file differ from the corresponding provider system license file parameters to allow continued access to the user requested content item by the user in accordance with the provider system license file parameters.

10. The method of claim 9, wherein the license file parameters include one or more of the following parameters: date, user's country of origin, monetary value on account, user's technical information, type of content to be downloaded, number of times the content has been downloaded and grace periods.

11. The method of claim 9, further comprising a step wherein the license file is created by a license server.

12. The method of claim 9, further comprising the step of storing the provider system license file parameters using a subscription management system.

13. The method of claim 9, further comprising the step of storing one or more license file parameters in the registry.

14. The method of claim 9, further comprising the step of storing the content on a content server which is part of the provider system.

15. The method of claim 9, wherein individual license files are created for individual content items.

16. The method of claim 9, wherein one license file is created for a plurality of content, the license file including one or more parameters for each content.

* * * * *